(12) United States Patent
Nguyen et al.

(10) Patent No.: US 7,575,161 B2
(45) Date of Patent: *Aug. 18, 2009

(54) SYSTEMS AND METHODS FOR PRE-SCANNING MERCHANDISE IN CUSTOMER'S SHOPPING CART WHILE CUSTOMER IS WAITING IN CHECKOUT LINE

(75) Inventors: Dung Nguyen, Rogers, AR (US); Aime V. Rodriguez, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 181 days.

This patent is subject to a terminal disclaimer.

(21) Appl. No.: 10/641,421

(22) Filed: Aug. 15, 2003

(65) Prior Publication Data

US 2004/0094620 A1 May 20, 2004

Related U.S. Application Data

(63) Continuation of application No. 10/097,952, filed on Mar. 14, 2002, now Pat. No. 6,619,546.

(51) Int. Cl.
*G06K 15/00* (2006.01)
(52) U.S. Cl. .................................................... 235/383
(58) Field of Classification Search ............... 235/383, 235/462.01; 280/648, 33.991, 33.992; 340/572.3, 340/573.1; 705/16–18, 23, 26
See application file for complete search history.

(56) References Cited

U.S. PATENT DOCUMENTS

| | | | | |
|---|---|---|---|---|
| 3,236,536 A | * | 2/1966 | Shore | 280/652 |
| 3,726,536 A | * | 4/1973 | Arino | 280/648 |
| 3,751,059 A | * | 8/1973 | Dunder et al. | 280/33.995 |
| 4,071,740 A | * | 1/1978 | Gogulski | 235/431 |
| D277,793 S | * | 2/1985 | Allen | D34/17 |
| 4,632,411 A | * | 12/1986 | Badger | 280/33.991 |
| 4,765,646 A | * | 8/1988 | Cheng | 280/651 |
| 5,012,966 A | * | 5/1991 | Turner et al. | 224/277 |
| 5,020,750 A | * | 6/1991 | Vrooman et al. | 248/97 |
| 5,042,063 A | * | 8/1991 | Sakanishi et al. | 379/88.03 |
| 5,149,947 A | * | 9/1992 | Collins, Jr. | 186/59 |
| 5,190,253 A | * | 3/1993 | Sable | 248/97 |
| 5,203,578 A | * | 4/1993 | Davidson et al. | 280/33.991 |
| 5,393,965 A | * | 2/1995 | Bravman et al. | 235/383 |
| 5,435,582 A | * | 7/1995 | Davidson | 280/33.992 |
| 5,557,088 A | * | 9/1996 | Shimizu et al. | 235/383 |
| 5,635,906 A | * | 6/1997 | Joseph | 340/572.3 |
| 5,660,476 A | * | 8/1997 | DeCoster | 383/29 |
| 5,700,021 A | * | 12/1997 | Leatherbury et al. | 280/47.35 |
| 5,884,728 A | * | 3/1999 | d'Estaintot et al. | 186/62 |
| 5,990,794 A | * | 11/1999 | Alicot et al. | 340/573.1 |
| 6,086,023 A | * | 7/2000 | Kerr et al. | 248/100 |

(Continued)

*Primary Examiner*—Kumiko C Koyama
(74) *Attorney, Agent, or Firm*—Priest & Goldstein, PLLC (57) ABSTRACT

Systems and methods for pre-scanning retail merchandise. A mobile scanning station includes a frame, and a pair of arms mounted to the frame, positioned to hold an open bag for receiving pre-scanned items. A platform is mounted to the frame, positioned under the pair of arms for providing a supporting surface for items contained in an open bag held by the pair of arms. The frame further includes an EAS deactivator support for holding an EAS deactivator for deactivating EAS tags on pre-scanned items before they are placed in the open bag.

21 Claims, 12 Drawing Sheets

U.S. PATENT DOCUMENTS

| | | | |
|---|---|---|---|
| 6,102,290 A * | 8/2000 | Swartz et al. | 235/462.01 |
| 6,154,135 A * | 11/2000 | Kane et al. | 340/572.3 |
| 6,224,072 B1 * | 5/2001 | Weck et al. | 280/47.35 |
| 6,281,796 B1 * | 8/2001 | Canipe et al. | 340/572.3 |
| 6,332,133 B1 * | 12/2001 | Takayama | 705/39 |
| 6,394,355 B1 * | 5/2002 | Schlieffers et al. | 235/472.01 |
| 6,484,939 B1 * | 11/2002 | Blaeuer | 235/383 |
| 6,491,218 B2 * | 12/2002 | Nguyen | 235/383 |
| 6,619,546 B1 * | 9/2003 | Nguyen et al. | 235/383 |
| 6,736,415 B1 * | 5/2004 | Lenihan | 280/47.19 |
| 6,866,193 B1 * | 3/2005 | Shimizu et al. | 235/383 |
| 2002/0082925 A1 * | 6/2002 | Herwig | 705/16 |

* cited by examiner

SYSTEMS AND METHODS FOR PRE-SCANNING MERCHANDISE IN CUSTOMER'S SHOPPING CART WHILE CUSTOMER IS WAITING IN CHECKOUT LINE

The present application is a continuation of U.S. patent application Ser. No. 10/097,952, filed on Mar. 14, 2002, now U.S. Pat. No. 6,619,546.

BACKGROUND OF THE INVENTION

1. Field of the Invention

The present invention relates generally to the field of retail checkout systems, and particularly to advantageous aspects of systems and methods for pre-scanning merchandise in a customer's cart while the customer is waiting in a checkout line in order to expedite the checkout process.

2. Description of Prior Art

During peak shopping periods, such as the winter holiday season, retail customers often experience delays in the checkout process as checkout lines increase in length. It is typically not an efficient use of store resources to increase the number of permanent checkout stations, particularly where peak periods occur relatively infrequently. There is thus a need for alternative ways to speed up the checkout process.

SUMMARY OF THE INVENTION

These and other issues raised by the prior art are addressed by the present invention, aspects of which provide systems and methods for pre-scanning retail merchandise. One aspect of the invention provides a mobile pre-scanning station. The station includes a frame, and a pair of arms mounted to the frame, positioned to hold an open bag for receiving pre-scanned items. A platform is mounted to the frame, positioned under the pair of arms for providing a supporting surface for items contained in an open bag held by the pair of arms. The frame further includes an electronic article surveillance (EAS) tag deactivator support for holding an EAS deactivator for deactivating EAS tags on pre-scanned items before they are placed in the open bag.

DETAILED DESCRIPTION

Aspects of the present invention provide systems and methods for providing spot assistance in the checkout process. These systems and methods are collectively referred to herein as the Line Rusher™ system. As described below, an aspect of the invention provides a mobile pre-scanning station, operated by a first store employee, which is used in conjunction with a checkout terminal, operated by a second store employee. While a customer is standing in line waiting to be checked out at the checkout terminal, the mobile pre-scanning station is used to perform certain checkout functions for some or all of the merchandise in the customer's cart. The checkout process is subsequently completed at the checkout terminal when the customer reaches the cashier at the head of the checkout line.

A typical retail checkout process not using a mobile pre-scanning station may include the following functions performed at a checkout terminal:

1. Examining each item to be purchased to determine whether the item bears a bar code;

2. Using a scanning unit to scan bar codes on bar-coded items;

3. Using a keypad to manually key in items that are not bar-coded;

4. Deactivating electronic article surveillance (EAS) tags affixed to items to be purchased;

5. Once all of the items have either been scanned or manually keyed in, processing payment, including any coupons or other store promotions; and 6. Bagging the purchased items.

According to an aspect of the invention, the above checkout process is modified so that certain functions are performed at a mobile station while the customer is standing in a checkout line, and certain other functions are performed at the permanent checkout station. The functions performed at the mobile station include:

1. Looking in the shopper's cart and identifying bar-coded items;

2. Using a wireless handheld scanning unit to pre-scan bar-coded items and storing the scan data in the store's checkout system;

3. Using a portable EAS deactivating unit to deactivate EAS tags on the pre-scanned items; and 4. Bagging the pre-scanned, EAS-deactivated items.

The functions performed at the permanent checkout stations include the following:

1. Retrieving the stored pre-scan data;

2. Manually keying in items that have not been pre-scanned, deactivating EAS tags on these items, and then bagging them; and 3. Processing payment, including coupons and other store promotions.

Thus, it will be seen that the relatively time-consuming processes of scanning bar-coded items in the shopper's cart and deactivating the EAS tags on these items is performed while the customer is standing in line. Further aspects of the invention will be understood in light of the following description.

Figure 1:
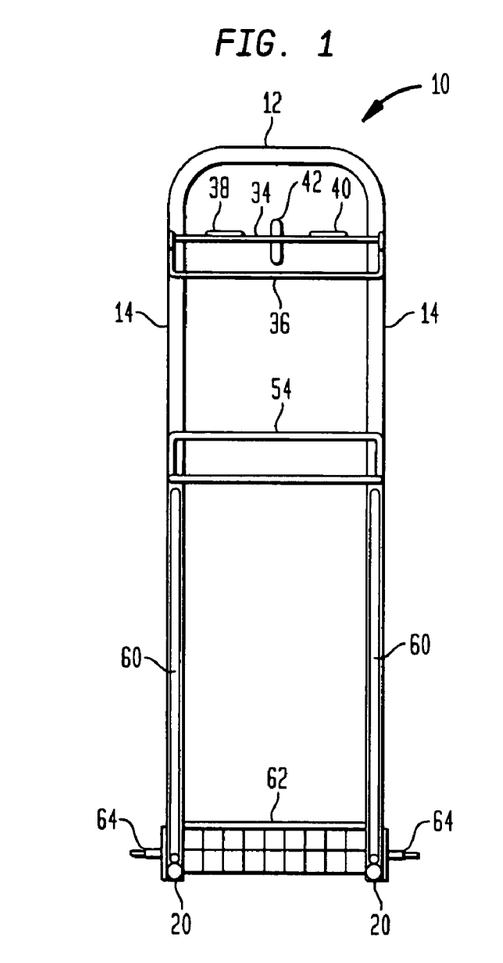
FIG. 1 shows a front elevation view of a cart according to an aspect of the invention.
Figure 2:
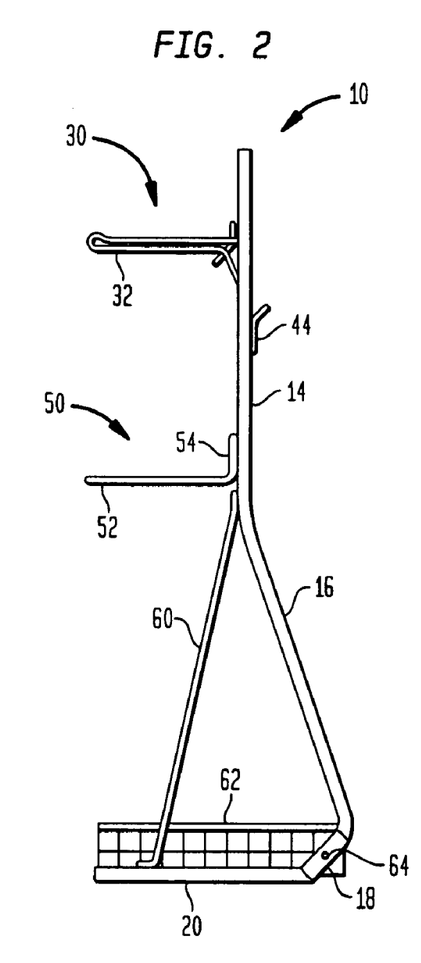
FIG. 2 shows a side view of the cart shown in FIG. 1.
Figure 3:
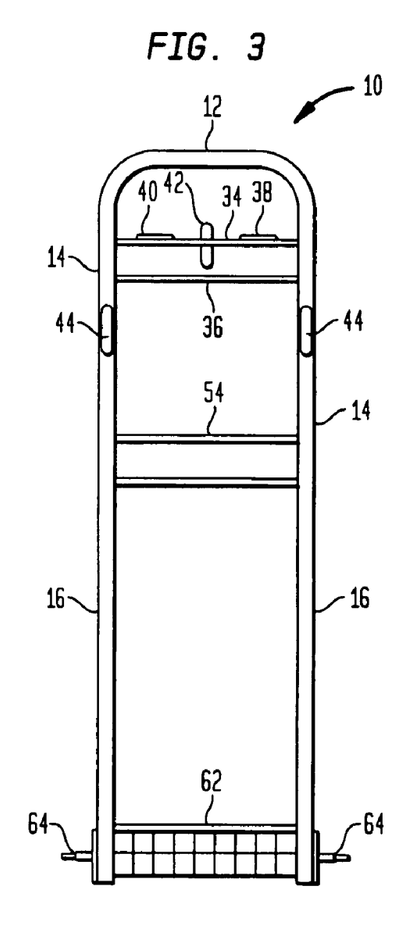
FIG. 3 shows a rear view of the cart shown in FIG. 1.

FIGS. 1, 2 and 3 show, respectively, front, side, and rear elevation views of a cart 10 according to a first aspect of the invention. As described below, the cart 10 provides a mechanical framework for the Line Rusher™ system. The cart 10 is designed to combine stability with a small footprint. In particular, the cart 10 is designed not to tip over, even when it is fully loaded. However, its relatively small size allows the cart 10 to be readily maneuvered into position, even when the store is crowded, and to be easily stored when it is not in use.

The frame of the cart 10 includes a handle 12, a pair of side posts 14 extending downward from either end of the handle 12, a pair of legs 16 extending downward at a rearward angle from the lower ends of side posts 14, a pair of ankles 18 extending downward at a forward angle from the lower ends of the legs 16, and a pair of feet 20, extending forward from the lower ends of the ankles 18.

An arm unit 30 is mounted to the front of the side posts 14. The arm unit includes a pair of arms 32 that project forward, an upper crossbar 34, and a lower crossbar 36. The upper crossbar 34 has fabricated thereon a first slot 38 and a second slot 40 on either side of a central post 42. Fabricated onto the rear of the side posts 14 under the arm unit 30 are a pair of hooks 44 that, as described further below, may be used to hold bags of pre-scanned items, as needed. There is mounted to the lower end of the side posts 14 a platform unit 50, that includes a forwardly projecting platform 52, and a mounting bracket 54. A pair of braces 60 is mounted onto the cart 10 between the lower end of the side posts 14, and the front end of the feet 20. A rectangular basket 62 is mounted between the feet 20, and a pair of axles 64 extends outward from each ankle 18. In the finished cart, wheels, not shown in FIGS. 1-3, are mounted onto the axles 64.

The above-described components are dimensioned and angled with respect to each other such that, when the cart 10 is in its normal, standing position, the arms 32 and platform 52 are substantially horizontal, with the platform 52 positioned underneath the arms 32. As described in further detail below, the arms 32, platform 52, and post 42 are used to hold a shopping bag. As further described below, the upper crossbar 34 and slots 38 and 40 are positioned relative to the handle 12 to allow a portable EAS deactivation unit to be seated in slot 40 and held between the crossbar 34 and the handle 12, and to allow a cardholder affixed to slot 38 to be easily accessed by a person using the cart 10.

Figure 4:
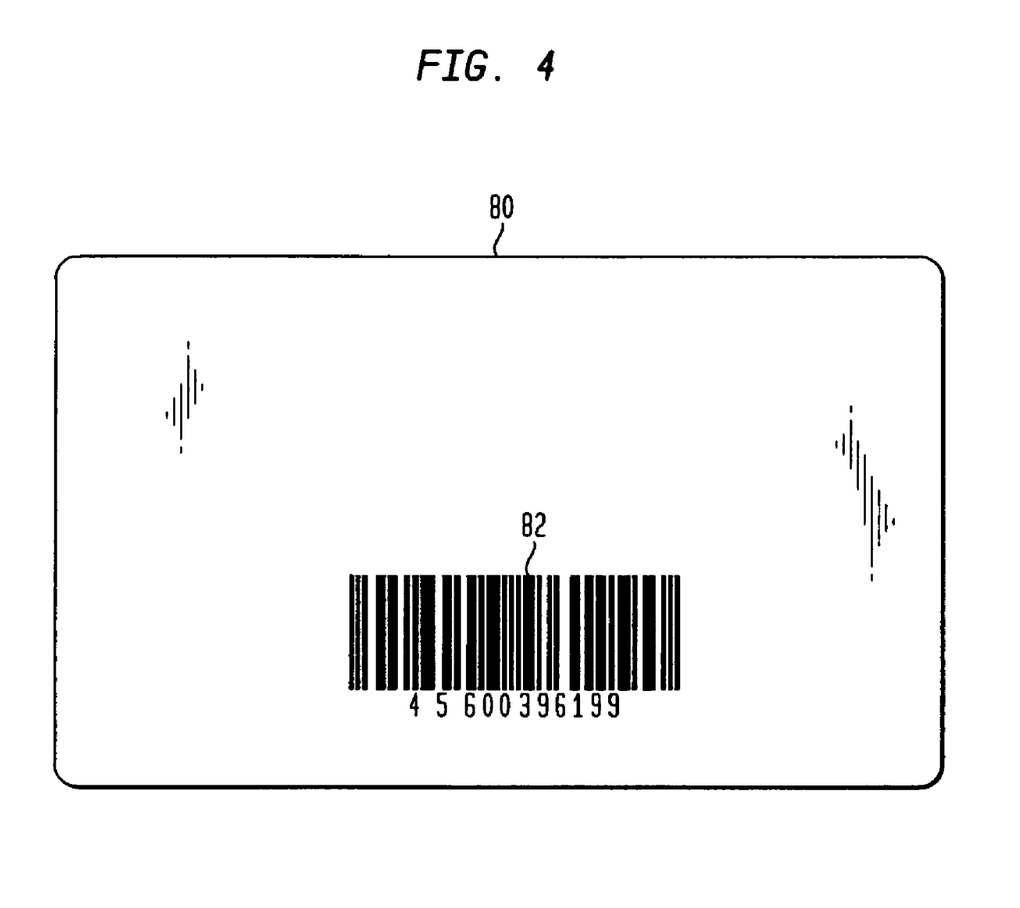
FIG. 4 shows an elevation view of a transaction identifier card suitable for use according to an aspect of the invention.

The cardholder affixed to slot 38 is used to hold transaction identifier cards, referred to herein as Line Rusher™ cards. FIG. 4 shows an elevation view of a Line Rusher™ card 80 according to an aspect of the invention. The card 80 is approximately the size and shape of a credit card and bears a unique bar code 82 that is used to identify the pre-scan information to the system for subsequent retrieval at the checkout terminal.

Returning to FIGS. 1-3, the side posts 14 of the cart 10 are substantially vertical and are positioned so that they are approximately over the center of gravity of the cart 10 so that the cart is stable when it is at rest in its normal standing position. The wheels affixed to the axles 18 are dimensioned so that the wheels engage the floor when the cart is tipped backwards, but are clear of the floor when the cart is in its normal standing position so the cart 10 does not move after it has been rolled to a desired location. According to a further aspect of the invention, additional footing elements, such as small spherical knobs, may be affixed to the bottom of the feet 20 for increased stability.

The handle 12, side posts 14, legs 16, ankles 18, and feet 20 may be fabricated from a single length of metal tubing, which is bent or otherwise shaped to form these elements. Plugs may be inserted into either end of the tubing to close off the tube openings. The arm unit 30 may be fabricated from a single length of metal tubing or from a metal rod that is bent or otherwise shaped to form the arms and crossbars. The slots 38 and 40 and central post 42 may be separately manufactured and then welded or otherwise mounted onto the top crossbar 34 of the arm unit 30.

The platform bracket 54 may be fabricated from a single length of metal tubing or from a metal rod that is bent or otherwise shaped to form the bracket. The platform 52 may be fabricated separately from a sheet of metal that is cut and then mounted to the bracket 54. Once the platform 52 has been mounted to the bracket 54, the resulting platform unit 50 may then be welded or otherwise mounted to the side posts 14. According to a further aspect of the invention, there may be provided at the rear of the platform 54 a rectangular cutout section, not shown in FIGS. 1-3, extending across the platform under the arm unit crossbars 34 and 36. As described further below, the cutout section is dimensioned and positioned to receive the bottom portion of a bag stack mounted into the cart.

The braces 60 may be separately fabricated from strips of metal that have been bent or otherwise formed into a suitable shape. Once formed, the brackets 60 are then welded or otherwise mounted to the side posts 14 and feet 20. The wire basket 62 is also separately fabricated and then welded or otherwise mounted between the feet 20. The axles 64 may be fabricated as separate units and then welded or otherwise mounted to the ankles 18. Alternatively, holes may be provided through the ankles 18, and the axles 64 may be provided by bolts that are threaded through the holes.

Suitable dimensions for the cart 10 include the following:

| | |
|---|---|
| Overall Height: | 42" |
| Arm Height: | 36.875" |
| Arm Length: | 9.125" |
| Back Hook Height: | 32" |
| Platform Height: | 25.5" |
| Platform Length: | 9.375" |
| Platform Cutout Width: | 2" |
| Brace Length: | 20.5" |
| Angle between Side Posts and Legs: | 160° |
| Angle between Legs and Feet: | 70° |
| Base of Frame: | 12.5" (width) × 15.5" (length) |
| Wheel Base: | 16.375" (axle tip to axle tip) |
| Axle Bolt Length: | 1.5" |
| Wheel Radius: | 1.468" |

Figure 5:
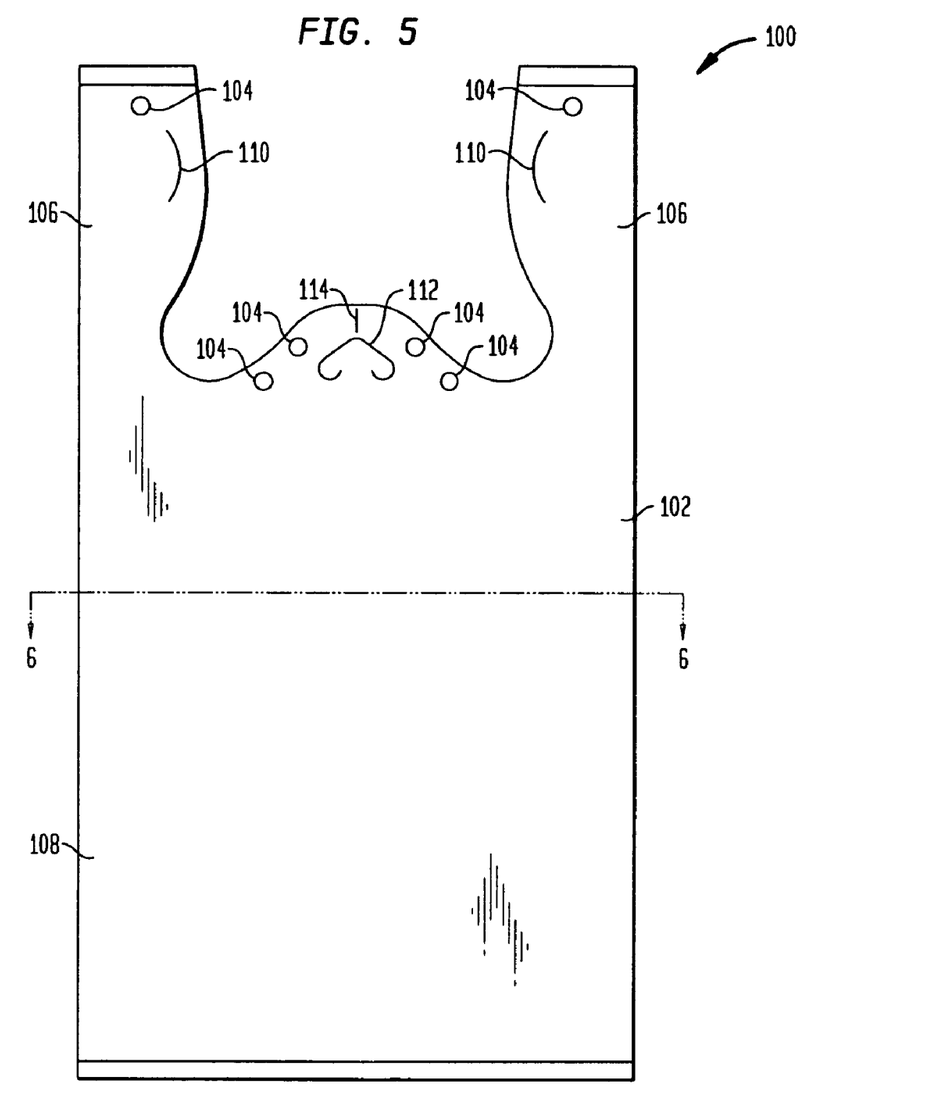
FIG. 5 shows an elevation view of a bag stack suitable for use according to an aspect of the invention.
Figure 6:
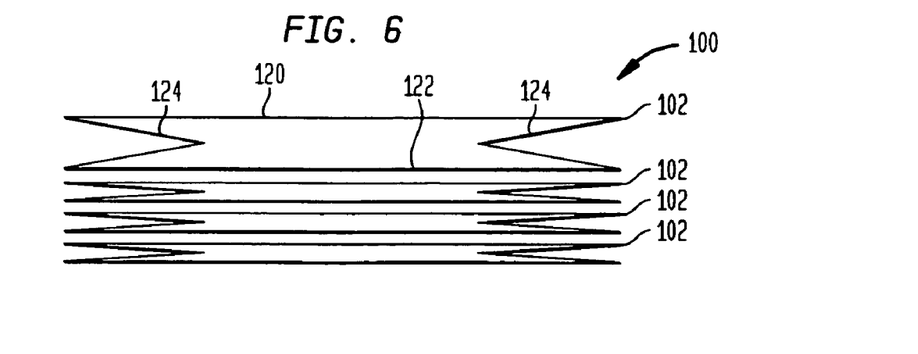
FIG. 6 shows a cross section of the bag stack shown in FIG. 4 through the plane 5-5.

FIG. 5 shows an elevation view of a bag stack 100 suitable for us in the Line Rusher™ system, and FIG. 6 shows a cross section of the bag stack 100 through the plane 6-6. As shown in FIGS. 5 and 6, the stack 100 includes a plurality of individual shopping bags 102 stacked on top of each other, and attached to each other at a number of spot welds 104. The welds 104 are designed to release when bags 102 are pulled apart from each other. The bag stack 100 may suitably be fabricated from a plastic material using thermoforming and die cutting techniques.

Each bag 102 in the stack 100 includes a pair of handles 106 and a pouch 108. Each handle includes a slit 110 for receiving a support arm, such as the arms 32 shown in FIGS. 1 through 3, and a heart-shaped flap 112 that pulls back to form an opening that fits over a central post, such as the post 42 shown in FIGS. 1-3. The slits 110 are shaped and positioned such that they away to release the handles 104 from the support arms 32. In addition, a center slit 114 is provided on top of the heart-shaped flap 112 to allow the bag to be torn away from the central post 42. As shown in FIG. 6, each bag includes front and back panels 120 and 122, side pleats 124 that unfold when the bag 102 is opened.

Thus, in preparing the cart shown in FIGS. 1-3 for use, a bag stack, such as the bag stack 100 shown in FIGS. 5 and 6, is loaded onto the cart 10 by inserting the supporting arms 32 through the handle slits 104, and fitting the flapped opening 112 over the central post 42. The bags 102 are dimensioned so that when the stack of bags 100 is loaded onto the support arms 32 and central post 42, the bottom of the pouch 108 may be tucked into the rectangular cutout at the rear of platform 52. The bottom of the bag stack 100 is then held in position in the platform cutout by the platform 52 and the platform bracket 54.

A bag 102 is prepared for loading by pulling the front panel 120 of the top bag in the stack 100 forwards. The rear panel 122 is held in place by the post 42, and the bag handles 106 are held up by the arms 32. The bottom of the pouch 108 rests on the platform 52. Thus, as the bag is being loaded with pre-scanned items, the weight of these items is borne mostly by the platform 52, rather than by the arms 32. This arrangement serves a number of functions. First, it makes it easier for a user of the cart to hold a bag in a fully open position, even after items have been placed in the bag. Further, minimizing the weight borne by the arms 32 tends to prevent a bag 102 from prematurely releasing from the arms 32 and post 42 during the bagging process and allows a bag 102 to be easily released from the arms 32 and post 42, even when the contents of the bag 102 are unusually heavy or bulky.

Figure 7:
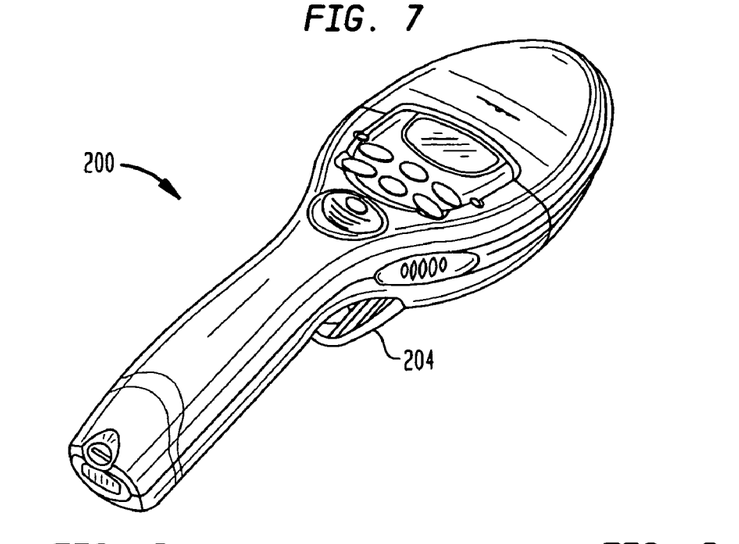
FIG. 7 shows a perspective view of an EAS deactivation unit suitable for use according to an aspect of the invention.
Figure 8:
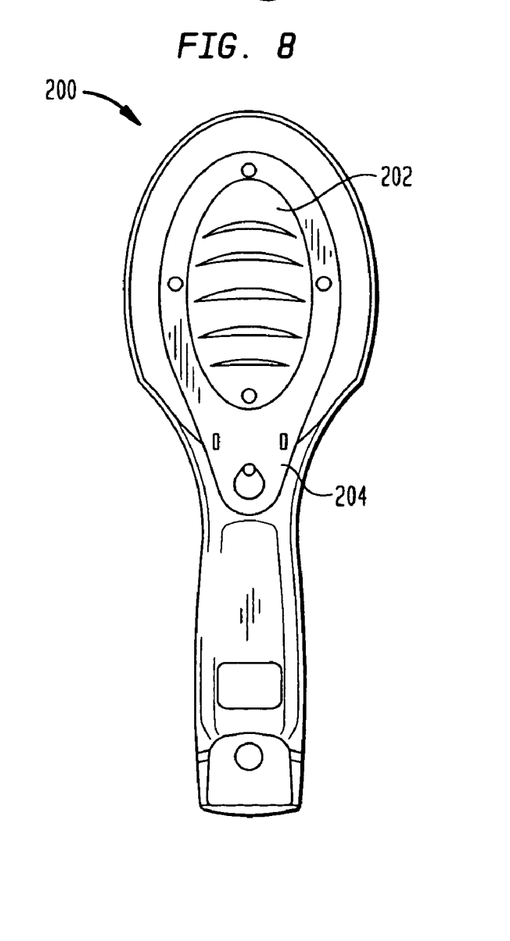
FIG. 8 shows a bottom view of the unit shown in FIG. 6.
Figure 9:
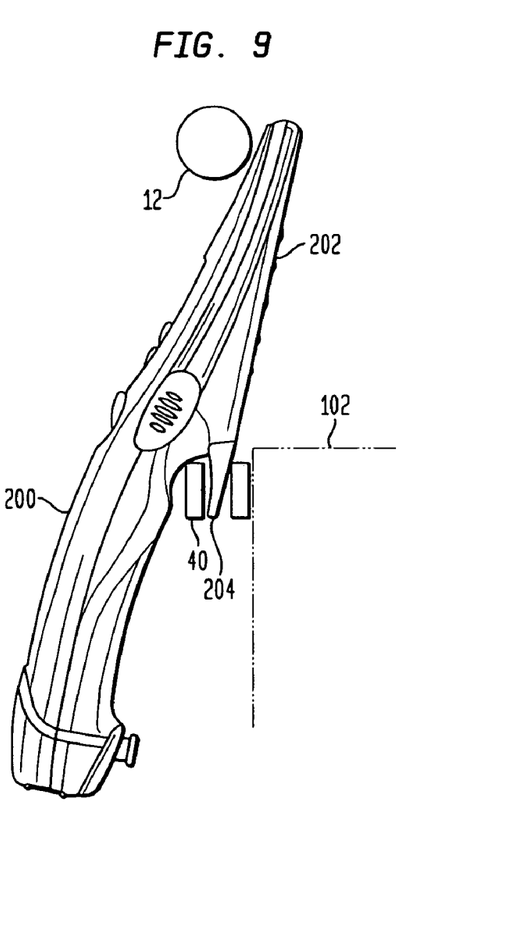
FIG. 9 shows a side view of the unit shown in FIG. 6.

FIGS. 6, 7 and 8 show, respectively, perspective, bottom, and side views of a portable EAS deactivation unit 200 suitable for use in the Line Rusher™ system. The deactivation unit 200 includes a deactivation surface 202. When an EAS tag is passed proximate to the deactivation surface 202, the EAS tag is deactivated. As shown in FIG. 8, the EAS deactivation unit 200 includes a tab 204, which is used to lock the unit 200 into a security base (not shown). The tab 204 is also used in the Line Rusher™ system to hold the deactivation unit 200 in position on a cart, such as the cart 10 shown in FIGS. 1-3. As shown in FIG. 9, the tab 204 is seated in slot 40 of the cart 10. The back of the head of the deactivation unit 200 rests against the cart handle 12. As described in further detail below, the position of the EAS deactivation unit 200 on the cart 10 allows a user of the cart 10 to use one hand to operate a scanning gun and to use the other hand to remove an item to be pre-scanned from a customer's cart, deactivate an EAS tag on the pre-scanned item, and place the item in a shopping bag.

Figure 10:
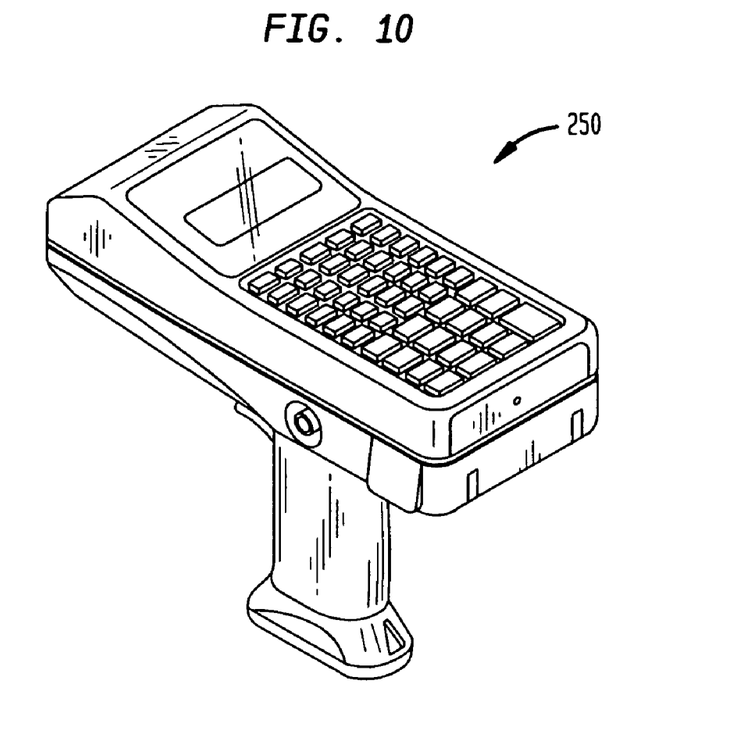
FIG. 10 shows a perspective view of a handheld scanning unit suitable for use according to an aspect of the invention.
Figure 11:
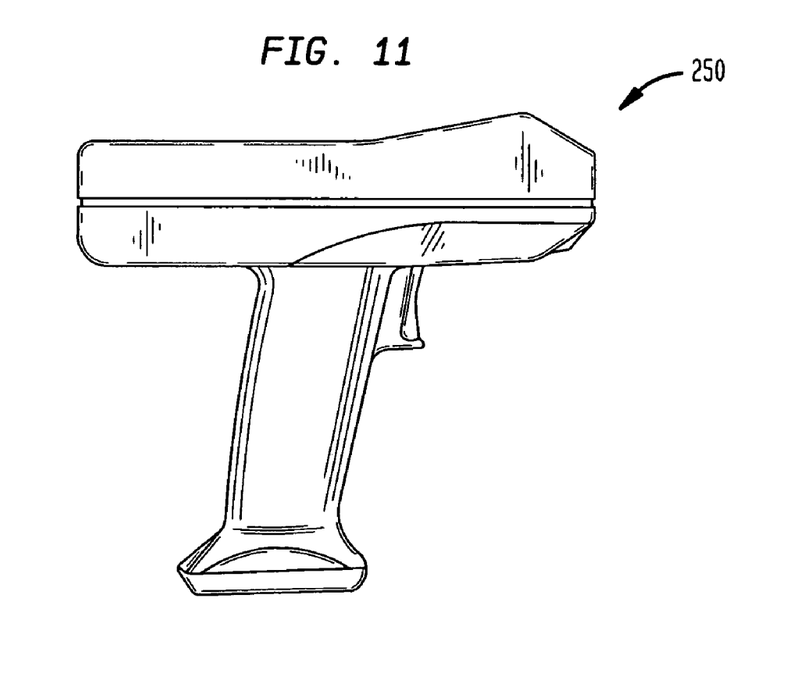
FIG. 11 shows a side view of the scanning unit shown in FIG. 9.

FIG. 10 shows a perspective view and FIG. 11 show shows a side view of a wireless handheld scanning unit 250 suitable for use with the Line Rusher™ system. The scanning unit may be hung over the handle 12 of the cart 10, or may be carried separately by the employee. It should be noted that other types of scanning units may be used without departing from the spirit of the invention.

Figure 12:
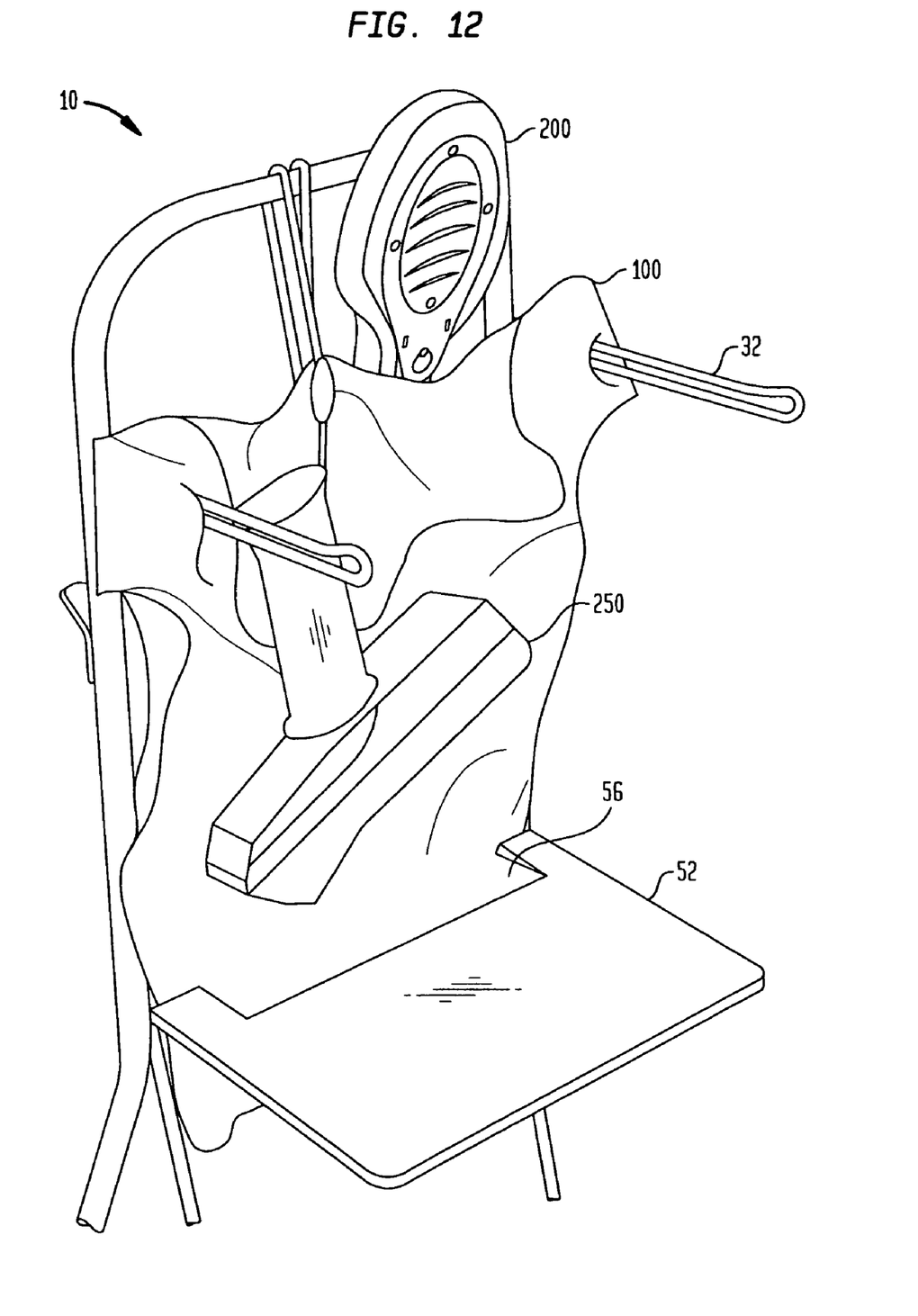
FIG. 12 shows a front perspective view of a Line Rusher™ cart, loaded with system components.
Figure 13:
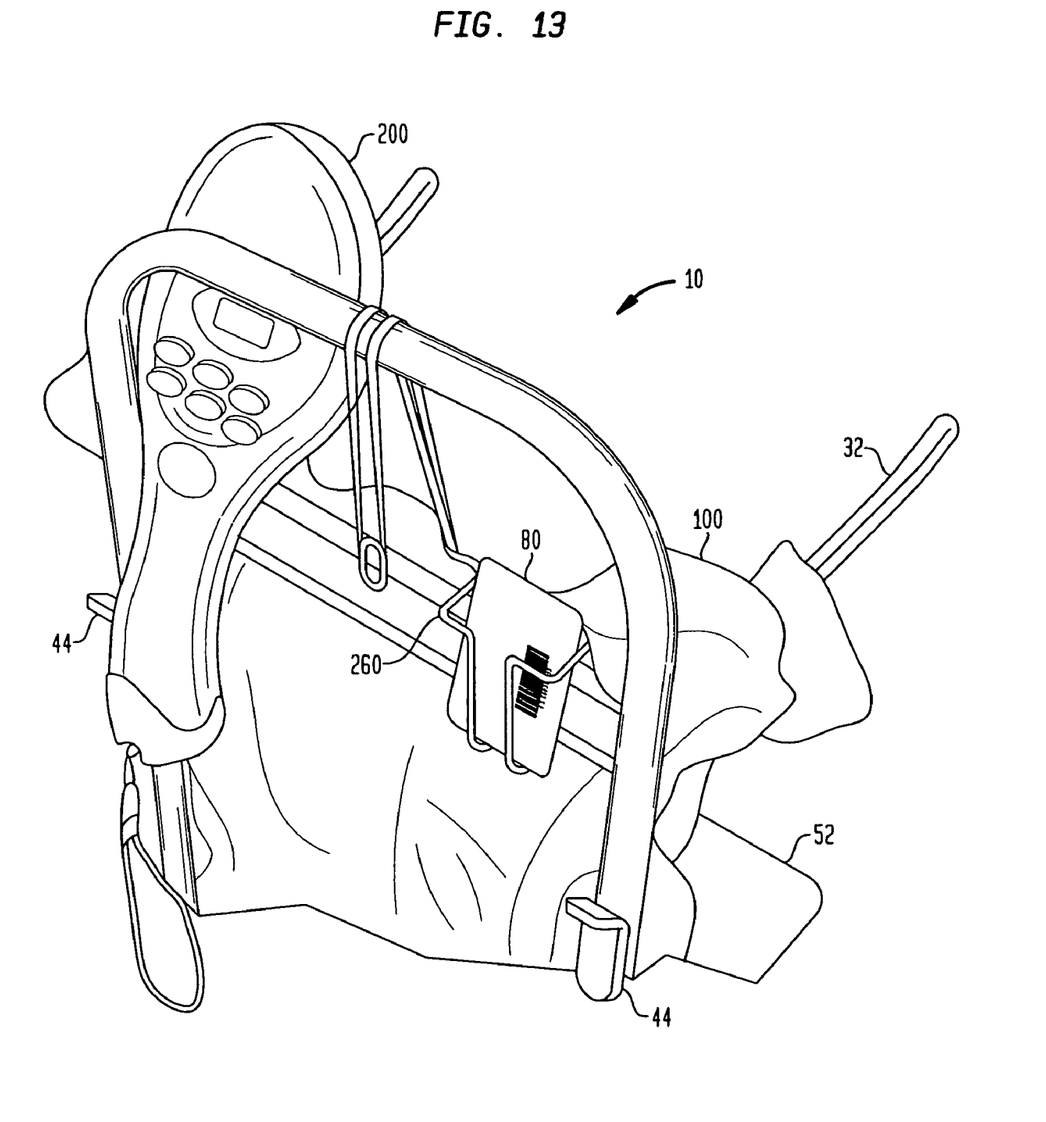
FIG. 13 shows a rear perspective view of the cart shown in FIG. 12.
Figure 14:
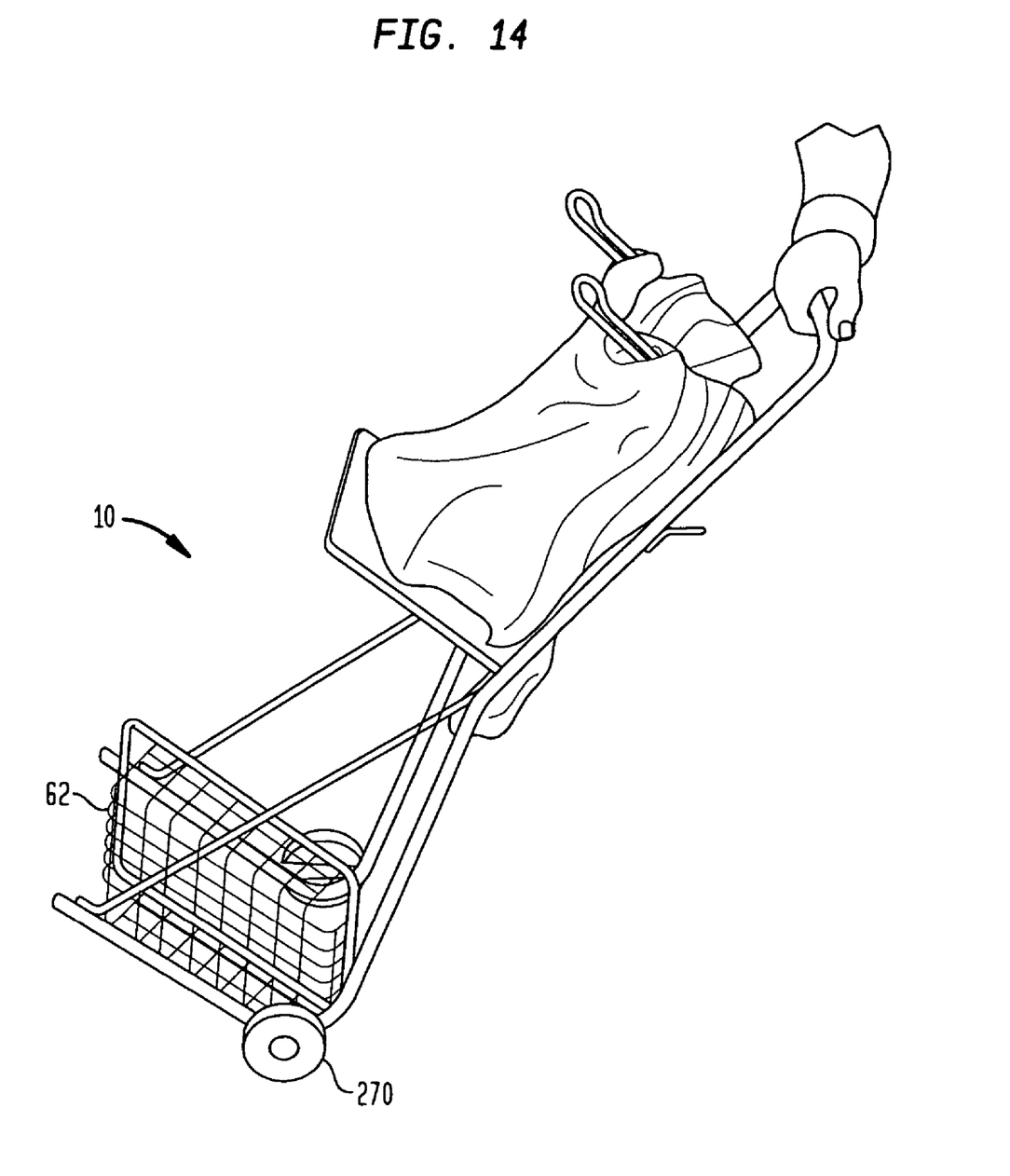
FIG. 14 shows a perspective view of the cart being rolled into position.
Figure 15:
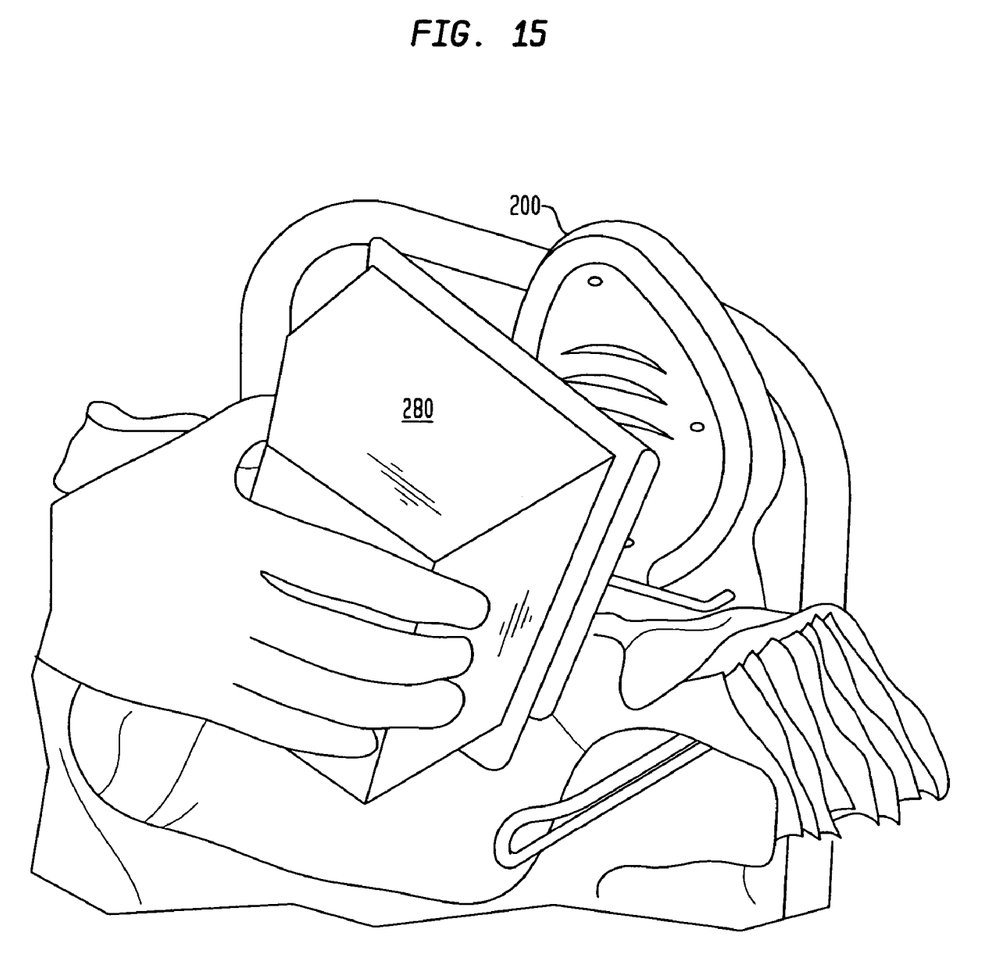
FIG. 15 shows a perspective view of a retail item being deactivated prior to loading into a shopping bag.
Figure 16:
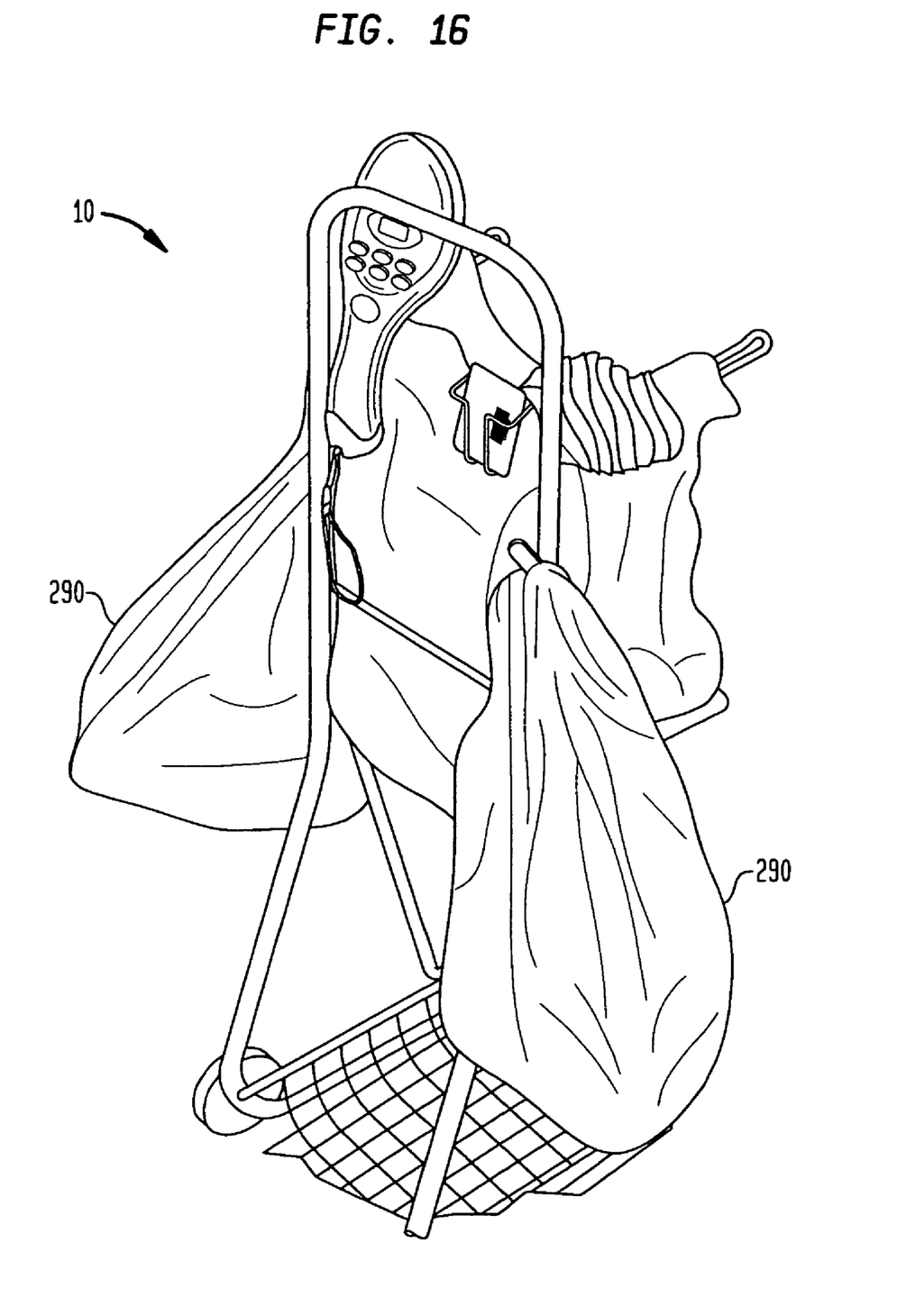
FIG. 16 shows a perspective view of a cart with loaded bags hanging off back hooks.

FIG. 12 shows a front perspective view and FIG. 13 shows a rear perspective view of the above-described components loaded onto a cart 10. FIG. 13 further illustrates the cardholder 260, which is used to hold Line Rusher™ cards. FIG. 14 shows a perspective view of the cart 10 that has been tipped backward to allow the wheels 270 to engage the floor, and to allow the cart to be rolled into position by a store employee. As described above, the cart 10 is in its normal, standing position, the wheels 270 do not engage the floor at all. If necessary, the store employee may place his or her foot at the rear of the cart's basket 62 to provide a steady pivot axis for the cart 10 as it is tipped backwards. As shown in FIG. 15, the EAS deactivation unit 200 is conveniently located to deactivate each pre-scanned item 280 before it is bagged. FIG. 16 shows the Line Rusher™ cart 10 with bags of pre-scanned merchandise 290 hanging from the back hooks 44.

Figure 17:
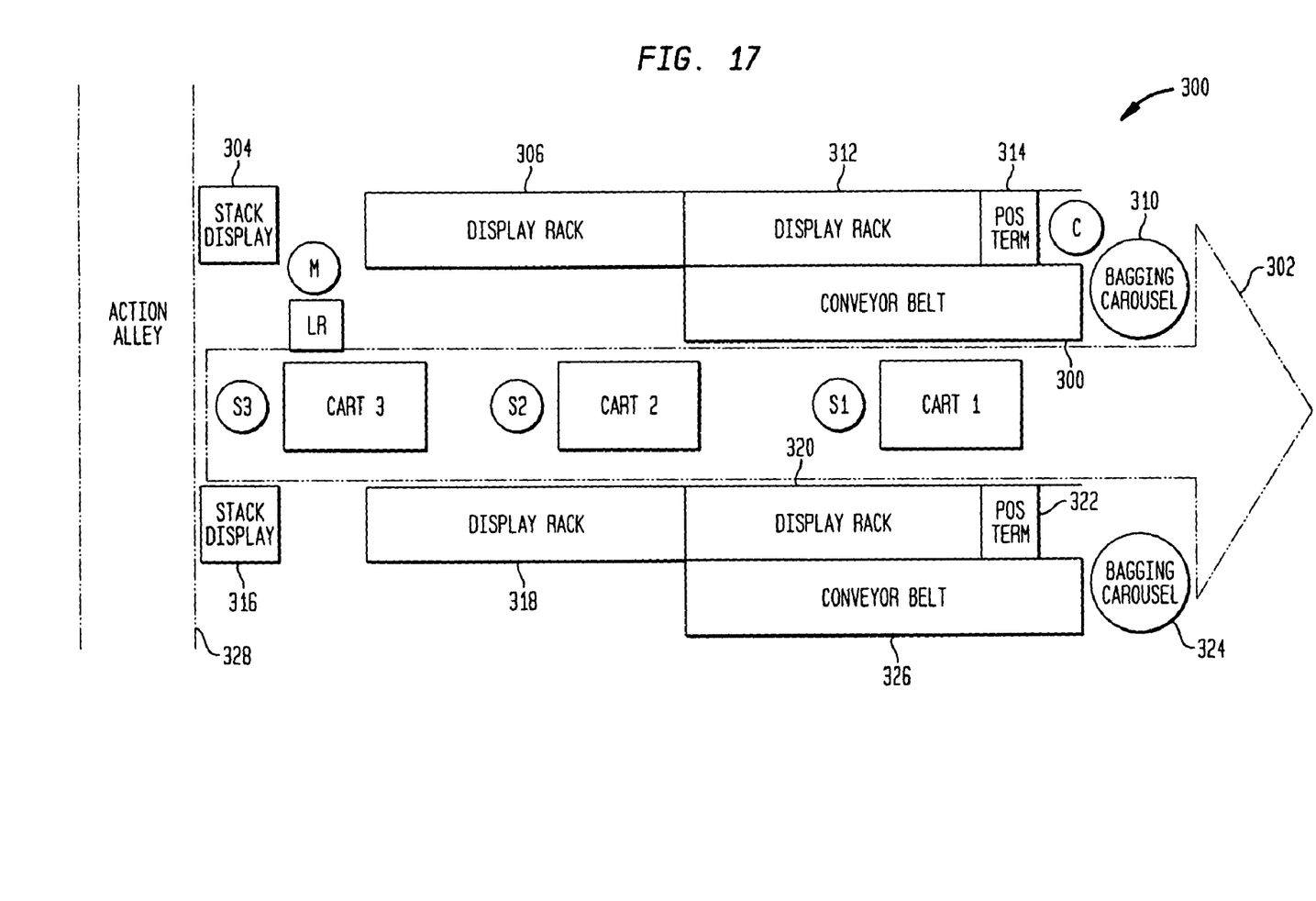
FIG. 17 shows a diagram of a line configuration.

FIG. 17 shows a diagram of a portion of a checkout area 300 in a retail store. The checkout area 300 includes a checkout lane, which is defined on its left side by a first stack display 306, a first display rack 306, a first conveyor belt 308, and a first bagging carousel 310. Behind the first conveyor belt 308 is a second display rack 312 and a point-of-sale (POS) terminal 314 operated by a cashier C. The right side of the checkout lane 302 is defined by a second stack display 316, a third display rack 318, a fourth display rack 320, a second POS terminal 322, and a second bagging carousel 326. A second conveyor belt 326 Is located on the far side of display rack 320 and POS terminal 322. In the checkout area 300 shown in FIG. 17, the first and second display racks 306 and 312 are used to display merchandise to a shopper in the left neighboring lane, not shown. The second POS terminal 322, bagging carousel 324 and conveyor belt 326 are used to serve customers using the right neighboring checkout lane, not shown. In the checkout area shown in FIG. 17, shoppers gain access to a checkout lane 302 through a region of the store known as "action alley" 328.

As shown in FIG. 17, there are three shoppers S1, S2, and S3 standing in the checkout lane 302, each pushing a cart. A member of management M, sales associate, or other store employee with a Line Rusher™ cart LR roams among checkout lanes looking for a shopper in need of assistance. In the particular checkout area configuration shown, the manager M may find it easier to position the Line Rusher™ cart LR proximate to the third shopper S3 in line, or to shoppers in line behind the third shopper S3. However, it should be noted that, depending upon the configuration of a particular store's checkout area, different procedures can be used to implement the Line Rusher™ system.

Figure 18:
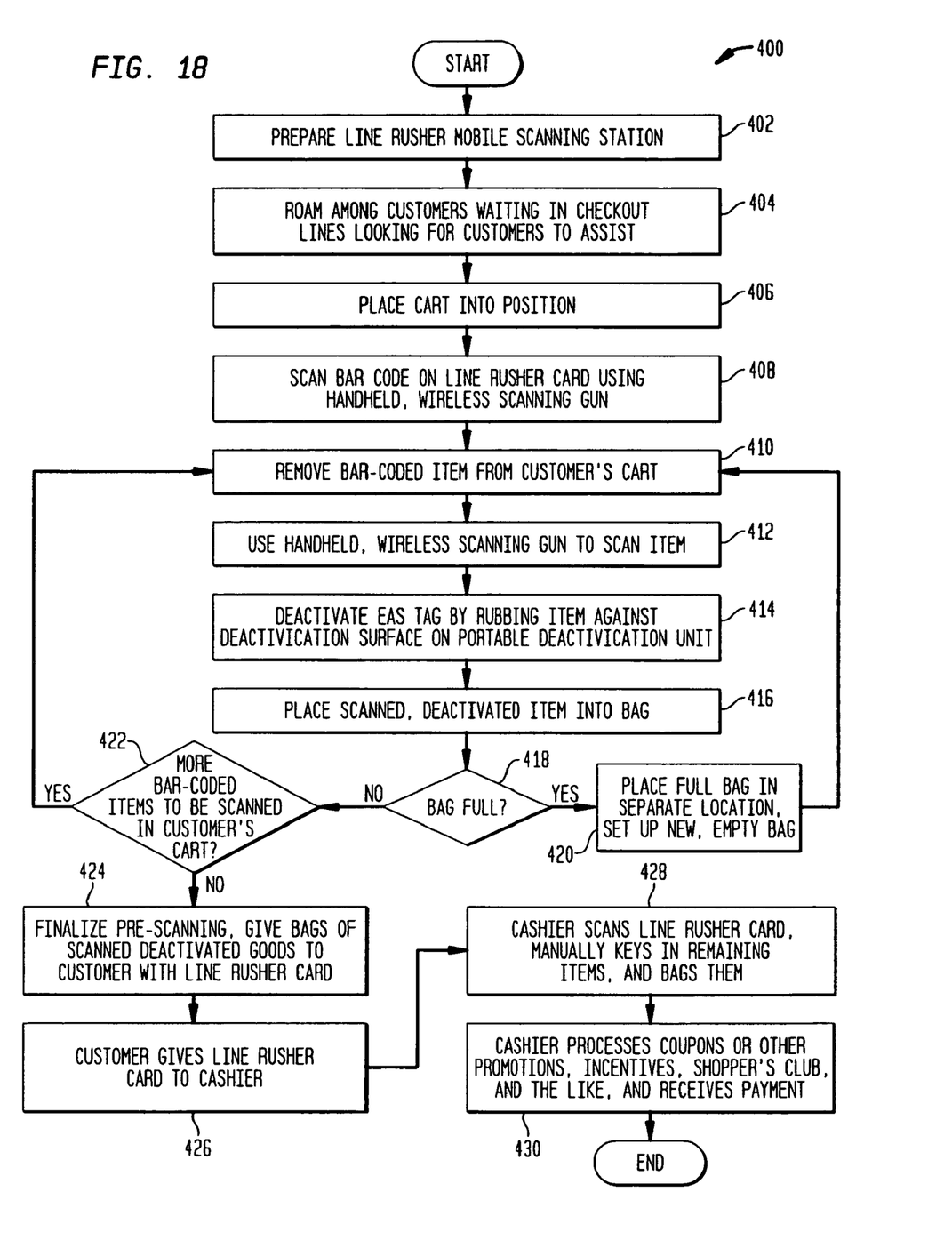
FIG. 18 shows a flowchart of a method according to an aspect of the invention.

FIG. 18 shows a flowchart of a method 400 according to an aspect of the invention. In step 402, the Line Rusher™ mobile scanning station is prepared for use. The preparation of the scanning station includes loading a stack of shopping bags onto the support arms 32 and post 42 of the cart 10, positioning an EAS deactivation unit 200 in slot 40 on crossbar 34, and making sure that there are Line Rusher™ cards 80 in the cardholder 260. In addition, the sales associate obtains a handheld scanning unit 250, which can be hung over the crossbar, or carried by the sales associate.

In step 404, the sales associate roams among checkout lanes, looking for a customer in need of assistance. In step 406, when this customer is found, the Line Rusher™ cart is placed into a convenient location proximate to the customer's cart. In step 408, the sales associate prepares a bag on the Line Rusher™ cart by pulling its front panel forward. In step 408, the sales associate takes a Line Rusher™ card out of the cardholder and scans the bar code printed thereon using the handheld scanning unit. The sales associate may give the Line Rusher™ card to the customer, or may hold onto it for safekeeping until the pre-scanning function has been completed. In step 410, the sales associate finds a bar-coded item in the shopper's cart and removes it. In step 412, the sales associate scans the item using the hand scanner. In step 414, if the pre-scanned item has an EAS tag, the sales associate deactivates the EAS tag by rubbing it against the deactivation surface of the deactivation unit. In step 416, the pre-scanned, deactivated item is then placed into the bag.

In step 418, it is determined whether the bag is full. If so, then in step 420, the associate removes the bag and puts it to the side, for example by hanging it on a back hook of the Line Rusher™ cart. Alternatively, bags of pre-scanned items may be placed in the customer's cart, if there is sufficient room. If the bag is not full, the sales associate in step 422 determines whether there are more bar-coded items in the shopper's cart. If so, the associate returns to step 410 and proceeds to pre-scan and deactivate the next bar-coded item in the cart. If there are no more items to be pre-scanned, then in step 424, the sales associate finalizes the pre-scanning operation then gives the bags of pre-scanned goods to the customer. The pre-scanning operation may be finalized, for example, by making a suitable key input into the keypad on the back of the scanning gun 250. If the customer has not already been given the Line Rusher™ card, it is given to the customer at the end of the pre-scanning process. It should be noted that the keypad and display on the back of the scanning gun 250 may also be used to edit the list of scanned items or even, if necessary, to void out the transaction entirely.

In step 426, the customer gives the Line Rusher™ card to the cashier at the checkout station. In step 428, the cashier scans the Line Rusher™ card at the checkout terminal, manual keys in any non-bar-coded items, deactivates these items, and then bags them. In step 430, the cashier handles payment and any promotions or coupons. It should be noted that all transactions in which the Line Rusher™ system is used may be voided out of the system at any time, similar to the way in which normal transactions are voided out. A Line Rusher™ transaction may be voided either using the hand-held scanning gun 250, or at the checkout terminal.

It is contemplated that the store employee will generally use one hand to operate the scanning unit, and use the other hand to handle the bar-coded items to be scanned. Particularly where small items are scanned, it will be seen that the store employee can pick up the item, scan it, deactivate it, and bag it, without having to put the scanning gun down. However, where the store employee needs the use of both hands, the employee may temporarily put the scanning gun down to free up both hands. For example, the employee may temporarily place the scanning gun in the customer's cart. Alternatively, the scanning gun may be hung from a belt or otherwise temporarily attached to the person operating the Line Rusher™ cart.

It will be apparent that the invention may be freely modified without departing from the spirit of the invention. For example, the size and shape of the mobile scanning cart may be modified to accommodate different store environments. It would also be possible to use other types of scanning devices in conjunction with the cart, or to attach additional devices, as desired.

It is contemplated that Line Rusher™ cards will be reusable. Once a Line Rusher™ transaction has been completed, or voided, any stored data associated with the bar-coded number on the Line Rusher™ card is reset to zero. The card is the available for reuse. However, it would also be within the spirit of the invention to use a disposable Line Rusher™ card that is only used once. Line Rusher™ cards are bar coded using standard printing techniques. It would also be possible to use other types of cards or techniques to identify the pre-scanned items.

From the above description, it will be seen that the present invention provides a useful way of enhancing a retail store's checkout capacity. The invention allows a sales associate to roam freely among multiple checkout lines, searching for customers that might benefit from the Line Rusher™ system. Alternatively, once a suitable location is found, the Line Rusher™ cart may remain in position for an extended period of time in order to speed up the checkout process.

Once the retail checkout lines have died down, the cart is rolled out of the way. Because the cart is relatively small, it can be easily stored in an unobtrusive location, utilizing a small amount of storage space. Further, it will be seen that the Line Rusher™ system may be used at locations other than at the main checkout counters.

It will further be appreciated that the Line Rusher™ cart allows a sales associate, or other store employee, to easily handle and transport all of the components required to perform the above-described pre-scanning operation. As described above, the pre-scanning operation requires a sales associate to handle a scanning gun, an EAS deactivation unit, Line Rusher™ card, and a bagging assembly. Without a Line Rusher™ cart, it would be difficult for a sales associate to perform the pre-scanning function in an efficient manner.

In addition, the Line Rusher™ cart secures all of the peripherals required for pre-scanning so that the cart may be freely rolled around a retail store. Once each peripheral has been properly seated into its designated location on the cart, a sales associate may quickly and easily transport the cart to wherever it may be needed, without any of the peripheral components dangling in harm's way or falling out of the cart.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A mobile pre-scanning station, comprising:
   a frame;
   a bag support mounted to the frame for holding an open bag for receiving pre-scanned items; and
   a platform mounted to the frame and positioned under the bag support for providing a supporting surface under items contained in the open bag held by the bag support,
   the frame further providing a mount for mounting an electronic article surveillance tag deactivator proximate to the open bag, the deactivator being used to deactivate electronic article surveillance tags on pre-scanned items before the items are placed in the open bag,
   the mobile pre-scanning station having wheels and a footprint of approximately 13 inches by 16 inches or smaller, the wheels and the footprint of the station allowing the station to be readily rolled among customer shopping carts in a retail checkout line by a store employee performing a pre-scanning function.

2. The mobile pre-scanning station of claim 1 further including a post mounted to the frame proximate to the bag support for holding a bag stack.

3. The mobile pre-scanning station of claim 2, wherein the bag support comprises pair of arms and the pair of arms and the post are positioned with respect to each other for receiving a bag stack, each bag in the bag stack having a pair of handle slits through which the pair of arms is inserted and a central opening fitting over the post.

4. The mobile pre-scanning station of claim 1, wherein the mount for the electronic article surveillance tag deactivator includes a slot for receiving a tab on the electronic article surveillance tag deactivator.

5. The mobile pre-scanning station of claim 1, further including a cardholder for holding a transaction identifier card.

6. The mobile pre-scanning station of claim 1, wherein the frame includes a handle and a pair of side posts extending downward from the handle, and wherein a pair of arms extend forward from an arm unit mounted to the side posts.

7. The mobile pre-scanning station of claim 6, wherein the arm unit includes a crossbar mounted between the side posts.

8. The mobile pre-scanning station of claim 7, further including a central post mounted to the crossbar for receiving a bag stack.

9. The mobile pre-scanning station of claim 7, further including a slot mounted to the crossbar for receiving an electronic article surveillance tag deactivator.

10. The mobile pre-scanning station of claim 7, further including a slot for receiving a cardholder for holding a transaction identifier card.

11. The mobile pre-scanning station of claim 1, wherein the platform is mounted to a bracket that is mounted to the frame.

12. The mobile pre-scanning station of claim 11, further including a section behind the platform for receiving a bottom portion of a bag stack held by the pair of arms.

13. The mobile pre-scanning station of claim 1, wherein the frame includes a handle, a pair of side posts extending downward from the handle, a pair of legs extending downward from the side posts, a pair of ankles extending downward from the legs, and a pair of feet extending forward from the ankles, and wherein the handle and feet are substantially horizontal, and wherein the side posts are substantially vertical and positioned over the feet.

14. The mobile pre-scanning station of claim 13, wherein said wheels are mounted to the ankles, the wheels engaging a floor when the station is tipped backwards.

15. The mobile pre-scanning station of claim 13, further including a basket mounted between the feet.

16. The mobile pre-scanning station of claim 1, wherein said wheels are mounted spaced apart along an axle adjacent one end of a bottom portion of the frame, whereby a user tilts the mobile pre-sc aiming station and rolls it on the pair of wheels to move the pre-scanning station into position and then lowers an end opposite said one end of the bottom of the frame once the pre-scanning station is in position, said lowering tending to hold the pre-scanning station in place.

17. A mobile pre-scanning station, comprising:
a frame;
a bag support mounted to the frame for holding an open bag for receiving pre-scanned items; and
a platform mounted to the frame and positioned under the bag support for providing a supporting surface under items contained in the open bag held by the bag support,
the frame further providing a mount for mounting an electronic article surveillance tag deactivator proximate to the open bag, the deactivator being used to deactivate electronic article surveillance tags on pre-scanned items before the items are placed in the open bag,
the mobile pre-scanning station having wheels and a footprint of approximately 13 inches by 16 inches or smaller, the wheels and the footprint of the station allowing the station to be readily rolled among customer shopping carts in a retail checkout line by a store employee performing a pre-scanning function wherein said wheels are sized and mounted so that the wheels engage the floor when the station is tipped for rolling the station into position, but are clear of the floor when the station is in a normal standing position.

18. A method for pre-scanning retail merchandise, comprising:
(a) rolling a mobile pre-scanning station to a position proximate to a customer shopping cart of a retail customer waiting in a checkout line, the mobile pre-scanning station having wheels and a footprint of approximately 13 inches by 16 inches or smaller, the wheels and the footprint of the station allowing the station to be readily rolled among customer shopping carts in a retail checkout line by a store employee;
(b) scanning a transaction identifier card;
(c) scanning a bar-coded item from the customer's shopping cart;
(d) if the scanned item has an electronic article surveillance tag, using an electronic article surveillance tag deactivator seated in the mobile pre-scanning station to deactivate the electronic article surveillance tag;
(e) placing the scanned item into a bag held open by the pre-scanning station;
(f) repeating steps (c) through (e) for other bar-coded items in the customer's shopping cart; and
(g) giving the transaction identifier card to the customer.

19. The method of claim 18 wherein, after pre-scanning has been completed, pre-scanning is finalized by making an input into a scanning device used to scan bar-coded items from the customer's shopping cart.

20. The method of claim 18, further including:
hanging full bags of pre-scanned items onto hooks on the back of the pre-scanning station.

21. The method of claim 18, wherein the wheels are sized and mounted so that the wheels engage the floor when the station is tipped , but are clear of the floor when the station is in a normal standing position further including:
tipping and rolling the mobile pre-scanning station among checkout lines to find a retail customer for pre-scanning.

* * * * *